US012754009B2

(12) United States Patent
Thyagarajan et al.

(10) Patent No.: US 12,754,009 B2
(45) Date of Patent: Oct. 6, 2026

(54) IMAGE-PLANE SELF-CALIBRATION IN INTERFEROMETRY USING CLOSED TRIAD IMAGING

(71) Applicants: ASSOCIATED UNIVERSTIES, INC., Washington, DC (US); COMMONWEALTH SCIENTIFIC AND INDUSTRIAL RESEARCH ORGANISATION, Black Mountain (AU); CAMBRIDGE ENTERPRISE LIMITED., Cambridge (GB)

(72) Inventors: Nithyanandan Thyagarajan, Myaree (AU); Christopher L. Carilli, Socorro, NM (US); Bojan Nikolic, Cambridge (GB)

(73) Assignee: Associated Universties, Inc., Vienna, VA (US)

( * ) Notice: Subject to any disclaimer, the term of this patent is extended or adjusted under 35 U.S.C. 154(b) by 86 days.

(21) Appl. No.: 18/878,488

(22) PCT Filed: Jun. 23, 2023

(86) PCT No.: PCT/US2023/026142
§ 371 (c)(1),
(2) Date: Dec. 23, 2024

(87) PCT Pub. No.: WO2023/250184
PCT Pub. Date: Dec. 28, 2023

(65) Prior Publication Data

US 2025/0383193 A1 Dec. 18, 2025

Related U.S. Application Data

(60) Provisional application No. 63/355,174, filed on Jun. 24, 2022.

(51) Int. Cl.
*G01B 9/02055* (2022.01)

(52) U.S. Cl.
CPC ..... *G01B 9/02074* (2013.01); *G01B 9/02075* (2013.01); *G01B 2210/52* (2013.01); *G01B 2290/10* (2013.01)

(58) Field of Classification Search
CPC ............ G01B 2210/52; G01B 2290/10; G01B 9/02074; G01B 9/02075; G01J 3/45; G01J 9/02
(Continued)

(56) References Cited

U.S. PATENT DOCUMENTS 12,104,901 B2 10/2024 Thyagarajan
2011/0020949 A1* 1/2011 Sugiyama ............... B01F 31/87 422/68.1
2013/0070048 A1* 3/2013 Huang ................... G01B 11/16 348/36

FOREIGN PATENT DOCUMENTS

CN 111275635 A * 6/2020 ............... G06T 5/50
CN 111275636 A * 6/2020 ............... G06T 5/92

OTHER PUBLICATIONS

PCT Search Report and Written Opinion for PCT/US21/41038, dated Mar. 8, 2022.

* cited by examiner

*Primary Examiner* — Sunghee Y Gray
(74) *Attorney, Agent, or Firm* — Remenick PLLC

(57) ABSTRACT

A method to derive phase-coherent images with an interferometer, in situations where interferometric phase errors can be factorized into element-based terms ('piston phases') is disclosed. The method is preferably implemented com-
(Continued)

pletely in the image domain, without resort to aperture plane measurements of visibilities, or element-based voltage complex gains.

18 Claims, 8 Drawing Sheets

(58) Field of Classification Search
USPC .......................................................... 356/445
See application file for complete search history.

IMAGE-PLANE SELF-CALIBRATION IN INTERFEROMETRY USING CLOSED TRIAD IMAGING

REFERENCE TO RELATED APPLICATIONS

This is a National Stage Application of PCT Application No. PCT/US23/26142, filed Jun. 23, 2023, which application claims priority to U.S. Provisional Application No. 63/355,174, filed Jun. 24, 2022 and entitled "IMAGE-PLANE SELF-CALIBRATION IN INTERFEROMETRY USING CLOSED TRIAD IMAGING," which are hereby specifically and entirely incorporated by reference.

RIGHTS IN THE INVENTION

This invention was made with government support under Cooperative Agreement AST-1519126, between the National Science Foundation and Associated Universities, Inc., and, accordingly, the United States government has certain rights in this invention.

BACKGROUND

1. Field of the Invention

The invention is directed to a method for image plane self-calibration using closed triad images.

2. Background of the Invention

The closure phase, defined as the phase of the higher-order (≥3) closed-loop product of the spatial coherences measured in an interferometer array, has been a valuable tool for many decades in challenging applications requiring high-accuracy phase calibration of the measuring devices and the propagation medium. This is because the closure phase is invariant to phase corruption, subsequent phase calibration and errors therein, attributable to the individual coherent voltage detectors in the array, acquired during the propagation and the measurement processes.

The closure phase represents a true measurement of the properties of the target object's brightness distribution, independent of these detector-introduced phase terms. Hence, closure phase provides information on the true brightness distribution of the object, even prior to calibration of detector-based phase terms. In radio interferometry, closure phase is measured in the aperture domain, by comparing the measured phases of the three individual interferometric visibilities in a closed triangle of antennas. In optical interferometry, the three visibility phases can only be measured and tracked in the image domain, converted to effective aperture-plane visibilities per baseline using a Fourier transform of the image, then mathematically combined to obtain the closure phase in a similar way as for radio interferometers.

Interferometry

Interferometry is a widely employed imaging technique that provides high spatial resolution through cross correlation of electromagnetic signals from an array of detector elements. We present this description primarily in the context of astronomical radio interferometric imaging, but the concepts are generalizable to optical and laboratory interferometry.

An interferometer measures the time-averaged cross correlation of the electric field voltages from pairs of detectors (or data capture devices), designated as 'visibilities', $V_{ab}(\lambda)$, where $\lambda$ is the wavelength of the radiation, and $x_a$, a=1, 2, . . . , N denotes the positions of the N detectors. In radio astronomy, the voltage detectors are phase coherent amplifiers in the aperture plane. In optical interferometry, the 'voltage detectors' are mirror elements that reflect the light coherently toward the focal plane, where images are recorded using an array of image capture devices in the focal plane such as CCDs. The Van Cittert-Zernike theorem states that these visibilities represent Fourier components of the source brightness distribution, with the projected visibility fringe spacing and orientation (the 'spatial frequency'), determined by projected baseline vector between detectors, $u_{ab}=x_{ab}/\lambda=(x_b-x_a)/\lambda$. The visibility relates to the spatial coherence of electric fields (measured as voltages) at each detector, $E_a(\lambda)$, and the object's brightness distribution, $I(\hat{s}, \lambda)$, as:

$$V_{ab}(\lambda) = \langle E_a^*(\lambda) E_b(\lambda) \rangle = \iint_{\Omega}^{Image} \Theta(\hat{s}, \lambda)\, I(\hat{s}, \lambda) e^{-i\,2\pi u_{ab}\cdot\hat{s}}\, d\Omega \tag{1}$$

where, the angular brackets indicate time average; $\hat{s}$, denotes a unit vector in the direction of any location in the image; $\Theta(\hat{s}, \lambda)$ denotes the array element's power response in the direction $\hat{s}$; and $d\Omega$ denotes the differential solid angle in the image-plane.

The voltages measured by the detectors are inevitably corrupted by complex-valued "gain" factors introduced by the intervening medium as well as the detector response. The corrupted measurements are denoted by $$E_a^m(\lambda) = G_a(\lambda) E_a^T(\lambda),$$

mums we superscript m denotes a measured quantity (i.e., corrupted by the medium and the detector response), superscript T denotes the uncorrupted, true source voltage, and $G_a(\lambda)$, known as the 'complex gain', denotes the net corruption factors to the voltage, introduced in the measurement process factorizable in such a way that it is attributable to the individual detector. Thus, a calibration process, which determines $G_a(\lambda)$, is required to correct for these gains to recover the true electric fields.

Neglecting measurement noise, the measured visibility, $$V_{ab}^m(\lambda),$$

between two detectors, a and b, then becomes:

$$V_{ab}^m(\lambda) = G_a^*(\lambda) G_b(\lambda) V_{ab}^T(\lambda) = |G_a(\lambda)||G_b(\lambda)|\left|V_{ab}^T(\lambda)\right| e^{i(\theta_b(\lambda)-\theta_a(\lambda)+\phi_{ab}^T(\lambda))}, \tag{2}$$

where, $$V_{ab}^T(\lambda)$$

is the true complex-valued visibility (spatial coherence) of the object in the image factorizable into its true amplitude, $$|V_{ab}^T(\lambda)|,$$

and phase, $$\phi_{ab}^T(\lambda).$$

A visibility is the product of two electric fields, and has units of squared voltage, or power. Similarly, $\theta_a(\lambda)$ is the phase in the complex-valued gains, $G_a(\lambda)$, introduced by the propagation medium and the detector. The measured visibility phase, hereafter also referred to as the interferometric phase, is given by the visibility argument:

$$\phi_{ab}^m(\lambda) = \phi_{ab}^T(\lambda) + \theta_b(\lambda) - \theta_a(\lambda). \quad (3)$$

Interferometric Calibration and Self-Calibration

The process of calibration determines the complex gain factors that correspond to the element-based distorting effects in Equation 2. Again, derivation is performed in the context of astronomical interferometry, but is generalizable to broader applications of interferometric imaging.

Calibration is typically done with one or more bright target objects ('calibrators'), whose visibilities are accurately known. Equation 2 is then inverted to derive the complex voltage gains, $G_a(\lambda)$, $G_b$ $(\lambda)$. If these gains are stable over the calibration cycle time, they can then be applied to the visibility measurements of the target source, to obtain the true sky visibilities, and the Fourier conjugate, namely, the sky brightness distribution.

Calibration can also be done using the target source itself, if it is sufficiently bright. This is called "self-calibration". In self-calibration, an initial a priori brightness model of the target object is used to predict the true visibilities. Again, Equation 2 can then be inverted to determine the element-based calibration terms which are then applied to obtain an updated model. The process is iterated until convergence is achieved. This type of calibration is carried out using measurements in the aperture plane, namely, visibilities, and referred to as "aperture plane self-calibration".

Closure Phase and Shape-Orientation-Size Conservation

The 'bispectrum' or 'triple product' for an interferometric measurement for three detectors, a, b, and c, is defined as:

$$B_{abc}^m(\lambda) = V_{ab}^m(\lambda)V_{bc}^m(\lambda)V_{ca}^m(\lambda).$$

It is straightforward to show that the argument, or phase, of the triple product for a closed triangle of data capture devices behaves as:

$$\phi_{abc}^m(\lambda) = \phi_{ab}^T(\lambda) + \theta_b(\lambda) - \theta_a(\lambda) + \phi_{bc}^T(\lambda) + \theta_c(\lambda) - \theta_b(\lambda) + \phi_{ca}^T(\lambda) + \theta_a(\lambda) - \theta_c(\lambda) \quad (4)$$

This is known as the 'closure phase' for a closed triangle of voltage detectors. The detector-based phase gain terms cancel in such a triple product, and the measured closure phase then equals the true closure phase, plus measurement noise:

$$\phi_{abc}^m(\lambda) = \phi_{abc}^T(\lambda) + \text{noise}. \quad (5)$$

The implication is that the measured closure phase is independent of the individual detector-based calibration terms (or phase corruption terms), and represents a direct measurement of the true closure phase due to structure of the source, modulo the system thermal noise.

The closure phase measures the symmetry of the source distribution. It is translation-invariant. Closure phase has been widely applied in astronomical interferometric studies ranging from stellar photospheres to black hole event horizons, to infer properties of the object's morphologies in situations where measuring and tracking the voltage capture device-based calibration terms may be problematic.

In radio astronomy, the visibility phases are measured directly in the aperture plane (i.e., the space defined by the voltage detectors), as the argument of the complex cross-correlation products of voltages between antennas, as per Equation (1). These visibility phases can then be summed in closed triangles to produce closure phases. In optical interferometry, voltages in the aperture plane (meaning, at the individual telescopes or siderostats themselves), cannot be measured, and the baseline-pair visibilities are generated via optics, beam splitters, and beam combiners, which coherently reflect and interfere the light from different telescopes on a single focal plane (typically a CCD), producing the interference fringes. The phase and amplitude of the visibilities are then extracted through a Fourier analysis of the image, effectively returning the measurement to the aperture plane, and closure phases are generated as the argument of the visibility triple product, defined above.

SUMMARY OF THE INVENTION

The present invention provides new tools and methods of image plane self-calibration (IPSC), using closed triad images.

A preferred embodiment is directed to a system for obtaining an image-plane self-calibrated image. The system includes an image sensor and a processor in communication with the image sensor. The processor assumes an image model, derives an initial triad image shift solutions of the image model, synthesizes a second model from the derived initial triad image shift solutions, derives a second triad image shift solutions of the second model, synthesizes a third model from the derived second triad image shift solutions, and outputs an image-plane self-calibrated image by summing the triad image shift solutions together. Further iteration is possible.

Preferably, there are a plurality of triads and the deriving and synthesizing steps are performed independently for each triad. The steps are preferably completed without resort to visibilities or detector voltages in the aperture plane. In a preferred embodiment the steps completed by the processor are geometrical and employ measured images of intensity.

Preferably, the deriving steps are calculated by computing the discrete two-dimensional cross-correlation of the triad image and the model image. In a preferred embodiment, a position of a maximum pixel of this cross-correlation is the shift that is applied to the triad images. The processor employs images made from closed triads of baselines.

Preferably, the image-plane self-calibrated image is a coherent image of the source brightness.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which:

FIG. 3A depicts interferometric fringes and phases, and closure phase on ideal (or perfectly calibrated) fringes, $F_{ab}(\hat{s}, \lambda)$. FIGS. 3B-C depict the same as the ideal case in FIG. 3A but when considering uncalibrated (FIG. 3B) and translated fringes (FIG. 3C).

DESCRIPTION OF THE INVENTION

Figure 1:
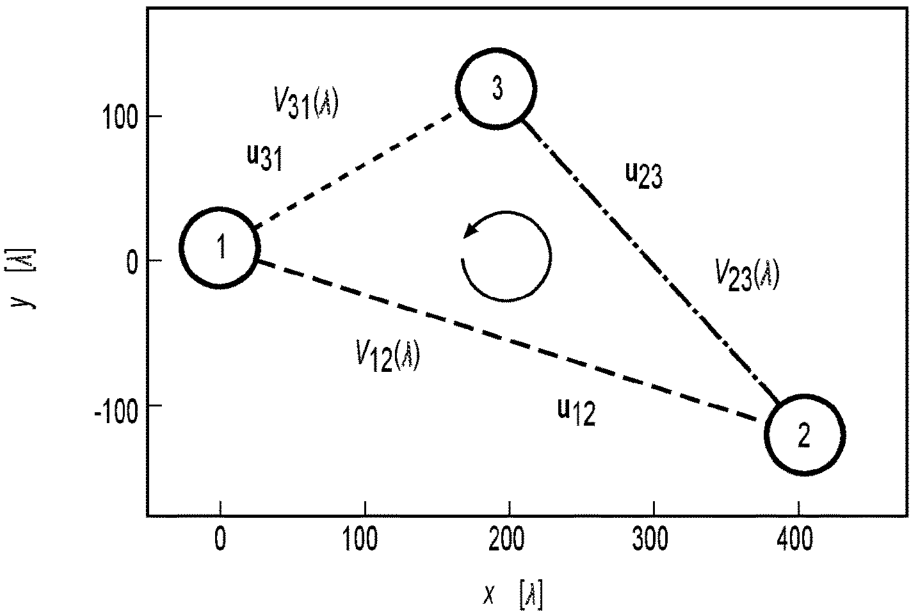
FIG. 1 depicts a triad of data capture devices (voltage detectors in the case of radio interferometry) depicted in the aperture plane, meaning, the plane containing the voltage capture devices.

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Methods of visualizing and measuring the closure phase directly from images made with the combined visibilities ('fringes') for three baselines in a closed interferometric triangle are disclosed. This image-based method results in a measurement of the closure phase, using images, without recourse to aperture-plane visibility phases for the separate baselines. An analytical formalism is developed to measure the closure phase geometrically in the image-plane from measurements on a generic N-polygon array of data capture devices (interchangeably referred to as voltage detectors in radio interferometry) in the aperture-plane. Using the simplest polygon (a triangle) of detectors, a gauge invariant relation is derived between the area enclosed by the detectors in the aperture-plane, the area enclosed by the interferometer responses ("fringes") in the image-plane, and the closure phase. The efficacy of the technique using both model data, and real observations made with the Jansky Very Large Array (JVLA) radio telescope as well as with the Event Horizon Telescope (EHT) interferometer array is demonstrable.

The methods may be useful in interferometry and remote sensing (passive and active). For example in radio wave applications such as interferometry at low and high frequency, where calibration may be problematic, a self-calibration technique using image-plane based closure phases can be applied entirely in the image domain to obtain high-dynamic range images; in gravitational wave interferometry; in seismic imaging; in radar imaging; in satellite imaging (i.e. space situational awareness, surveillance); and in ground imaging from space (i.e. climate, geology, general mapping, surveillance). As additional examples, in remote optical sensing, such as in optical and near-IR interferometry for both space and ground; in satellite imaging (i.e. space situational awareness, surveillance); and in ground imaging from space (i.e. climate, geology, general mapping, surveillance). In another example, in general imaging or spectroscopy applications using interferometric devices such as medical imaging, sonar interferometry, surveillance, and security screening. In another example, for determining the relativistic electron beam emittance in industrial synchrotron light sources using aperture mask interferometric imaging of the synchrotron emission.

Disclosed are two geometrical methods to determine closure phase in the image plane directly from the image of three fringes, without resorting to the individual visibilities themselves in the Fourier domain (aperture plane). This method may have computational or practical advantages for calculating closure phase in interferometric imaging applications involving robust identification of structural features, as closure phase is a largely incorruptible measure of the true morphological properties of the object being imaged. The methods preferably provide an understanding to visualize a difficult concept, which could spawn new applications in various fields and disciplines. The measurement method may be employed from a triad of array elements to N elements, where N is any number ≥3.

Furthermore, disclosed is a methodology of image plane self-calibration (IPSC), using closed triad images. Its effectiveness using simple, but realistic, models of the source and array configuration is demonstrated and some practical applications for interferometric imaging arrays are discussed. While the demonstrations are done in the context of astronomical interferometry, the technique is generalizable to broader applications of interferometric imaging and Fourier optics across the electromagnetic spectrum. The current process is most relevant for arrays with a small number of elements, particularly those in which measurements are made in the image-plane.

This is the first method proposed for performing interferometric self-calibration in the image plane, without resort to visibilities or detector voltages in the aperture plane. The method is geometrical and employs measured images of intensity. There is no requirement for a Fourier transform to visibility fringes in the aperture domain, as is done currently. The method may have computational advantages over current techniques, in particular in situations where the basic measurements are made in the image domain, such as optical interferometry and laboratory laser interferometry. The instant method is preferably most relevant for arrays with a small number of elements, particularly those in which measurements are made in the image-plane, and those that require high precision calibration and image recovery. The image data can be obtained from a variety of sensors including but not limited to capture devices, detectors, power detection devices, intensity detection devices, phase coherent voltage devices, voltage sensors, voltage receiving elements, other receiving elements, and combinations thereof.

Geometric Embodiments to Measure Closure Phase in the Image Domain:

Consider the three fringes, $F_{ab}(\hat{s}, \lambda)$, in the image-plane corresponding to $V_{ab}(\lambda)$ measured on a triad of data capture devices (voltage detectors in radio interferometry) indexed a=1, 2, 3, and b=(a+1) mod 3 in the aperture-plane as shown in FIG. 1. The null phase curves (NPC) for each of these fringes is given by:

$$2\pi u_{ab}.\hat{s} + \psi_{ab}(\lambda) = 0, \quad a = 1, 2, 3, \quad b = (a+1) \bmod 3. \tag{6}$$

Figure 2:
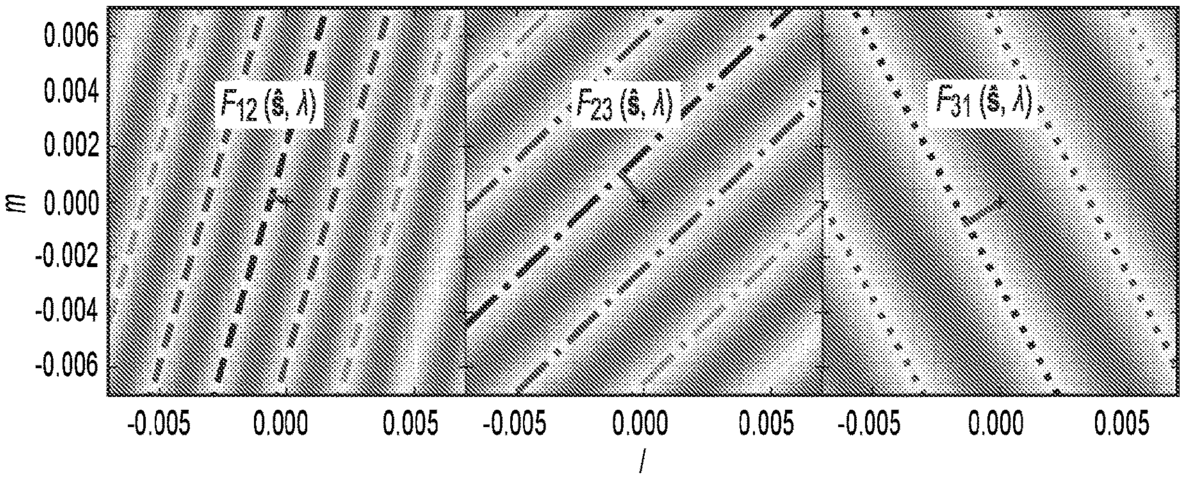
FIG. 2 depicts ideal fringes (in map and annotated by $F_{ab}(\hat{s}, \lambda)$) and the respective NPCs (lines) in the image-plane in direction-cosine (l, m) coordinates, with the line style in each panel corresponding to that of the detector spacings, $u_{ab}$, in FIG. 1.

FIG. 2 shows the fringe NPCs for visibilities modeled for the detector spacing shown in FIG. 1. The three fringes, $F_{ab}(\hat{s}, \lambda)$, are shown as a map and the NPCs are shown as black (principal fringe) and gray (secondary fringes differ in phase from the principal fringe by multiples of 2π) according to Equation (6) with the line styles corresponding to that in FIG. 1. The principal fringes enclose the "principal triangle" (shown by the gray shaded region).

The closure phase on this triad of data capture devices is $$\psi_3(\lambda) = \sum_{a=1}^{3} \psi_{ab}(\lambda), \quad b = (a+1) \bmod 3, \tag{7}$$

which is the sum of the phase offsets, $\psi_{ab}(\lambda)$, of the individual fringe NPCs from the phase center (origin in the image domain). Geometrically, the phase offsets are preferably obtained by measuring the angular distance along the perpendiculars dropped from the phase center to each of these fringe NPCs normalized by the respective fringe spacing along the perpendiculars, times 2π (see Equation (9) for the mathematical expression). For a calibrated interferometer, these measured phase offsets from the phase center for the fringes relate directly to the position of the target object on the sky, modulo 2π. The interferometric phases correspond to the angular offsets represented by the short gray line segments from the phase center (denoted by the + marker) in FIG. 2.

Figures 3A, 3B, 3C:
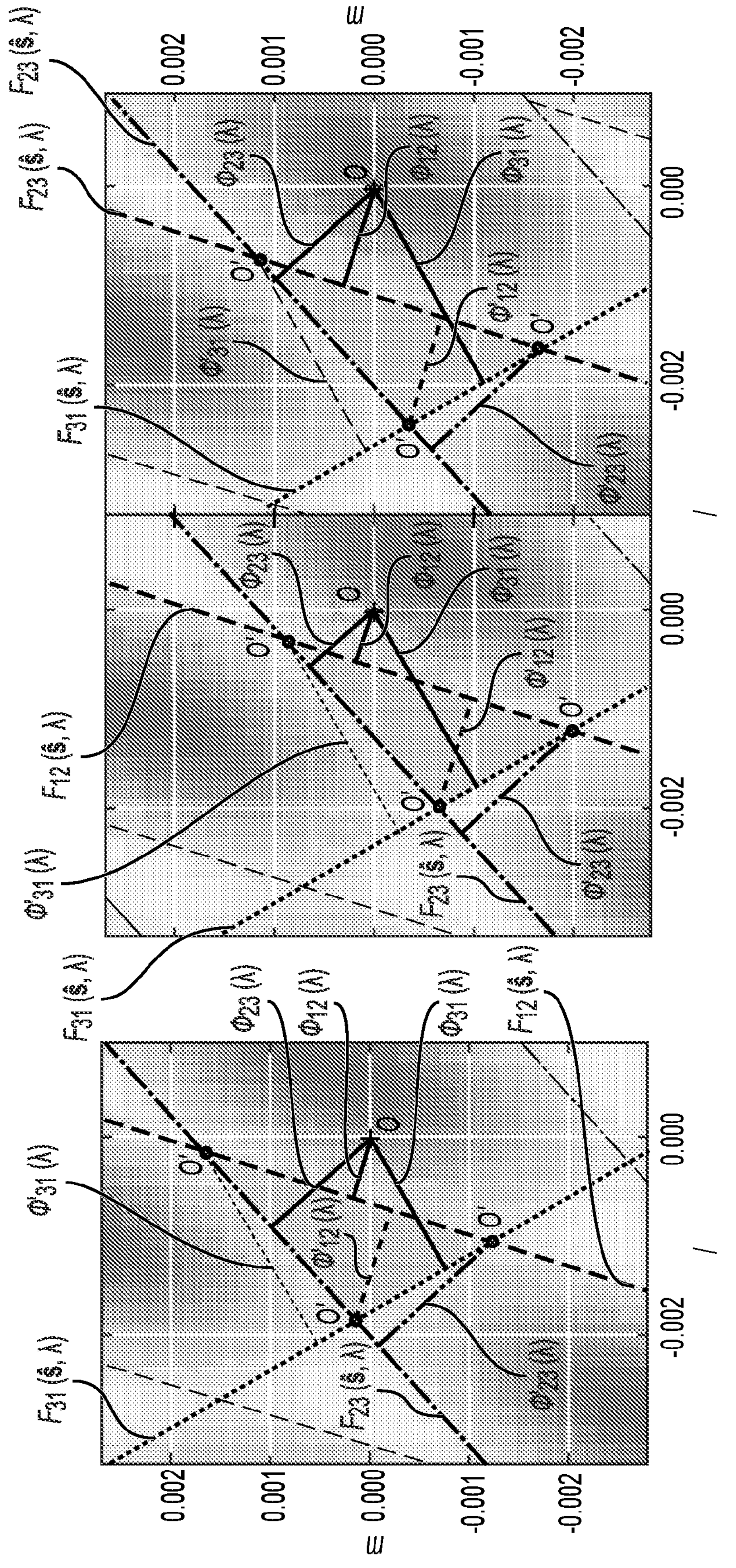
FIGS. 3A-C depict illustrations of the gauge-invariant nature of the closure phase.

If the phase center is shifted or if the visibilities (spatial coherence of the electric fields measured by the voltage capture devices) have corrupted phases introduced by the propagation medium or the detector response, the closure phase measured with respect to the new phase center remains unchanged because of its translation invariance property (see Equations (4) and (5), and FIGS. 3A-C). The phase center, $\hat{s}_0$, can be conveniently chosen to be at the point of intersection of any of the two fringe NPCs (or equivalently, any vertex of the principal triangle), for instance, $F_{12}(\hat{s}, \lambda)$ and $F_{23}(\hat{s}, \lambda)$. Because $\hat{s}_0$ lies on both $F_{12}(\hat{s}, \lambda)$ and $F_{23}(\hat{s}, \lambda)$, the interferometric phase offsets of these two fringes relative to the shifted phase center vanish, $$\psi'_{12}(\lambda) = \psi'_{23}(\lambda) = 0.$$

Therefore, the closure phase is equal to the remaining interferometric phase, namely, that of the third fringe, $$\psi_3(\lambda) = \psi'_3(\lambda) = \psi'_{31}(\lambda). \tag{8}$$

Thus, when the phase center is chosen to be at the intersection of any of the two fringe NPCs, the closure phase has a simple relation:

$$\psi_3(\lambda) = \psi'_{ab}(\lambda) = 2\pi|u_{ab}|\,\delta s'_{ab}(\lambda), \quad a = 1, 2, 3, \quad b = (a+1) \bmod 3, \tag{9}$$

where, $\delta d'_{ab}(\lambda)$ is the angular separation of the intersection vertex, which is now the chosen phase center, from the opposite fringe NPC corresponding to $F_{ab}(\hat{s}, \lambda)$ along its perpendicular. In simple terms, $$\delta d'_{ab}(\lambda)$$

corresponds to the height of the triangle from the chosen vertex to the opposite side. The same relation can be used to infer the interferometric phases as well by using $$\delta d'_{ab}(\lambda)$$

to measure the angular offset from the phase center.

FIGS. 3A-C demonstrate that the closure phase can be measured from the angular offset of any one of the intersection vertices to the opposite fringe NPC using Equation (9). They also show that when the fringes are uncalibrated or translated in the image domain, the fringes shift parallel to themselves while remaining constrained to preserve the shape, size, and orientation of the triangle enclosed by the fringes. This will be hereafter referred to as the "triangle SOS conservation principle". As a result, the closure phase also remains invariant to phase corruption and translation, and can be calculated geometrically in the image-plane, even from corrupted data as described above, without the need for calibration.

The three fringe NPCs reduces to three straight lines given by Equation (6). In general, there are three vertices for the principal triangle formed by the three points of intersection, one for each pair of the fringe NPCs. The area of the triangle enclosed by the three points of intersection between the three fringe NPCs in the image domain, $A_{I3}(\lambda)$, is related to the closure phase, $\psi_3(\lambda)$, and the area enclosed by the triad of data capture devices in the aperture plane, $A_{A3}(\lambda)$ in units of wavelength squared, by:

$$\psi_3^2(\lambda) = 16\,\pi^2\,A_{A3}(\lambda)\,A_{I3}(\lambda). \quad (10)$$

The subscripts A and I denote the aperture- and image-plane, respectively, and the subscript 3 denotes a triangle (3-polygon). Therefore, the product of the area enclosed by the triad of data capture devices in the aperture domain and the area enclosed by the three fringe NPCs in the image domain is gauge invariant and proportional to the closure phase squared. FIGS. 3A-C confirm that the SOS characteristics of the triangle enclosed by the fringes are not affected by mis-calibration or translation. This demonstrates that closure phase is directly related to the SOS characteristics of the triangle.

Thus, there are two geometrical methods to visualize and measure the closure phase in the image domain unlike the usual practice of measuring it from the aperture domain, namely:

1. The phase offset corresponding to the height of a vertex from its opposite side in a 3-element interference image according to Equation (9); and
2. The area enclosed by the principal triangle in the image domain is proportional to the closure phase squared divided by the area enclosed by the triad of data capture devices in the aperture-plane, according to Equation (10).

While it has been known that closure phase can be constructed from individual image plane measurements of the fringe phase via the NPC offset from a fixed position on the three individual fringe images separately, then summing these phases as in the aperture plane, the two methods described herein bypass such a need for three measurements in two ways: (i) in the case of the distance from a vertex method on a three fringe image, preferably only one fringe offset (=phase) need be measured to derive the closure phase, (ii) in the fringe triangle area method, this again requires only a single observation, namely a three fringe image, to obtain the closure phase.

Returning to the figures, FIG. 1 depicts a triad of data capture devices (voltage detectors in the case of radio interferometry) depicted in the aperture plane, meaning, the plane containing the voltage capture devices. The detector spacings projected in a plane perpendicular to the direction of the target object, $u_{ab}$, are in units of wavelengths, with a=1, 2, 3, and b≠a. $u_{ab}$ represents the spatial frequencies of the image-domain intensity distribution, $I(\hat{s}, \lambda)$, in the aperture plane. $V_{ab}(\lambda)$ denotes the complex-valued spatial coherence of $I(\hat{s}, \lambda)$ measured at $u_{ab}$ in the aperture-plane. The cyclic ordering of the detector spacings is indicated by the arrowed (anti-clockwise) circle, although the ordering can be reversed. The three spatial frequencies, $u_{ab}$, are shown by dashed, dash-dotted, and dotted lines, which will be used to denote the corresponding fringe NPC in the image-plane in subsequent figures.

FIG. 2 depicts ideal fringes (in map and annotated by $F_{ab}(\hat{s}, \lambda)$) and the respective NPCs (lines) in the image-plane in direction-cosine (l, m) coordinates, with the line style in each panel corresponding to that of the detector spacings, $u_{ab}$, in FIG. 1. Equation (6) yields the fringe NPCs. The black lines in each line style corresponds to the principal fringe NPC, while the varying shades of gray correspond to secondary fringe NPCs that differ in phase from the principal fringe by multiples of $2\pi$. The phase center (origin) is marked (with a + symbol). The offset from the phase center to each of the principal fringe NPCs is shown as the short gray line segments and is related to the interferometric phase, $\phi_{ab}$ ($\lambda$), by Equation (9).

FIGS. 3A-C depict illustrations of the gauge-invariant nature of the closure phase. FIG. 3A: Interferometric fringes and phases, and closure phase on ideal (or perfectly calibrated) fringes, $F_{ab}(\hat{s}, \lambda)$. The three principal fringe NPCs are annotated and shown in black lines with the line style corresponding to that in FIGS. 1 and 2. They enclose the principal triangle marked by the shaded region. Any gray lines are secondary fringe NPCs. The three principal interferometric phases, $\phi_{ab}$ ($\lambda$), are proportional to the angular offsets (see Equation (9)) shown in dark, continuous black line segments from the phase center (origin) marked by + and annotated by O. The principal closure phase, $\phi_3(\lambda)$, is the sum of the three corresponding principal interferometric phases, $\phi_{ab}$ ($\lambda$). The phase center can be conveniently shifted to be any one of the triangle's vertices, O', in which case the closure phase reduces simply to $$\phi_3(\lambda) = \phi'_{ab}(\lambda),$$

which are shown corresponding to the heights drawn from the vertex to the opposite side in marked as $$\phi'_{12},\ \phi'_{23},\ \text{and}\ \phi'_{31},$$

respectively, according to Equation (9). The area enclosed by the three principal fringe NPCs (the triangle enclosed by the three vertices each denoted O') is proportional to the closure phase squared (see Equation (10)). FIGS. 3B-C: Same as the ideal case in FIG. 3A but when considering uncalibrated (FIG. 3B) and translated fringes (FIG. 3C). As a result, all the fringe NPCs are displaced parallel to themselves relative to the phase center compared to the ideal case. The closure phase, which is still the sum of the three uncalibrated or translated interferometric phases (corresponding to the offsets in the dark, continuous black line segments), remains unchanged. Equivalently, the closure phase which is proportional to the triangle's heights (line segments marked $$\phi'_{12},\ \phi'_{23},\ \text{and}\ \phi'_{31})$$

are independent of these displacements as well as of the phase center. Though the fringes and the triangle enclosed by them are displaced, their displacements are constrained to be parallel to themselves with the only degree of freedom being translation, thereby preserving the same shape, orientation, and size. This shape-orientation-size (SOS) preservation, its invariance to detector-based phase corruption, and overall translation in the image-plane demonstrates the gauge-invariance of the closure phase.

Figure 4:
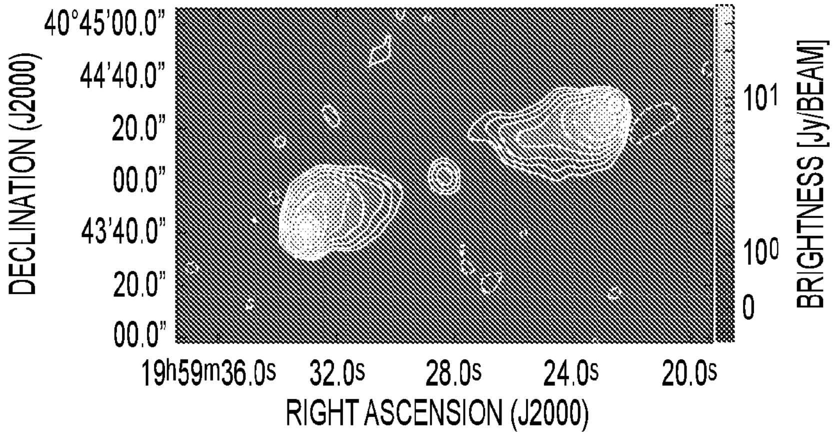
FIG. 4 depicts the synthesized image of a powerful radio galaxy, Cygnus A, from 4 min and 128 MHz of JVLA data at $\lambda$=3.75 cm.

FIG. 4 depicts the synthesized image of a powerful radio galaxy, Cygnus A, from 4 min and 128 MHz of JVLA data at $\lambda$=3.75 cm. Cygnus A has a complex structure at these wavelengths: a bright core centered on the active galactic nucleus (AGN) and two bright and non-symmetric lobes, classified as FR-II morphology. The angular resolution of the image ("beam size") is ≈8". The contours correspond to −2.5σ (dashed), 2.5σ, 5σ, 10σ, 20σ, 40σ, 80σ, 160σ, and 320σ, where, σ≈0.1 Jy/beam is the RMS of noise in the image. The gray scale bar uses a "symmetric" logarithmic scale to represent both negative and positive values of brightness.

Figure 5:
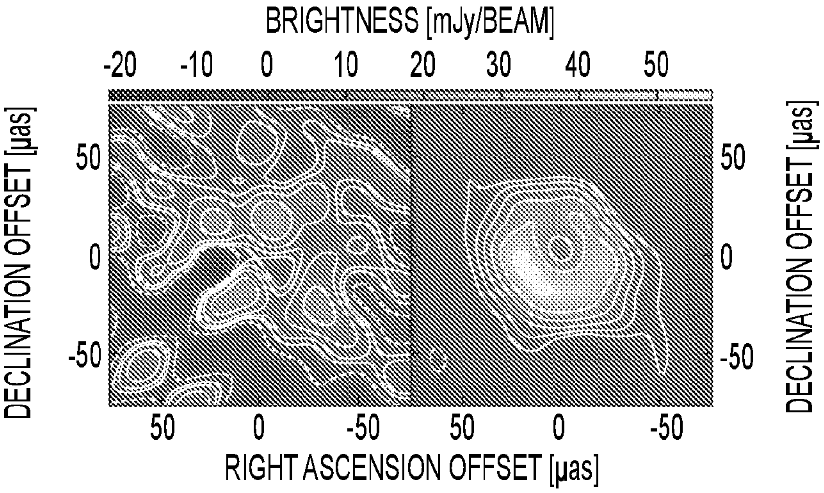
FIG. 5 depicts images of the radio galaxy M87 made using the publicly available Event Horizon Telescope data at 229.1 GHz.

FIG. 5 depicts images of M87 made using the publicly available Event Horizon Telescope data at 229.1 GHz. (Left): Images from the 'network-calibrated' data, i.e., with just a priori flux density and delay calibration. (Right): Images after hybrid mapping (iterative imaging and self-calibration), using a starting model consisting of an annular ring for the first iteration of phase self-calibration, although the final image, and in particular, the ring-like structure, is robust to changes in the starting model (e.g., point source, Gaussian, disk, etc.). The angular resolution of the image is ≈20 μas. The contour levels of surface brightness progress geometrically in factors of two. The contours correspond to −3σ (dashed), 3σ, 6σ, 12σ, 24σ, 48σ, and 96σ, where, σ≈0.51 mJy/beam is the RMS of noise in the self-calibrated image. The gray scale bar uses a linear scale as indicated on the top.

Figure 6:
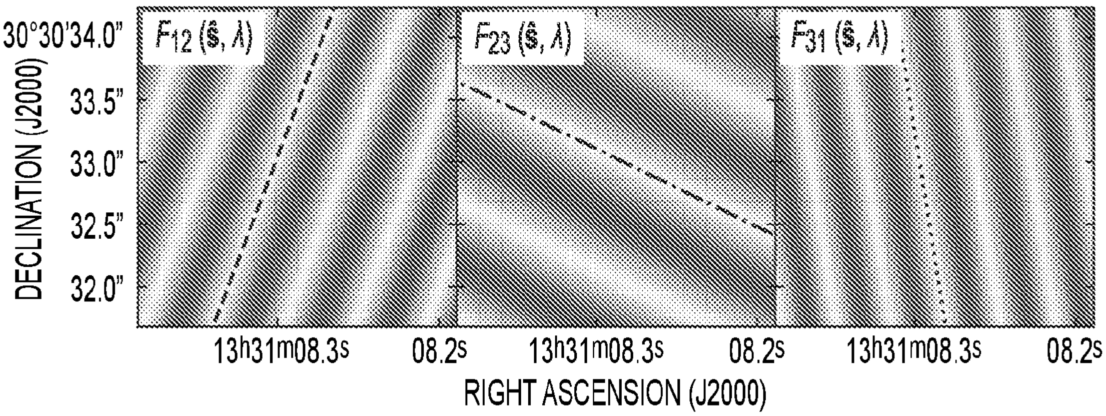
FIG. 6 depicts the three fringe patterns (maps and annotated by $F_{ab}(\hat{s}, \lambda)$) and the fitted fringe NPCs (black lines) in the image-plane for the uncalibrated data on the radio quasar 3C286 data at $\lambda$=3.2 cm with the JVLA.

FIG. 6 depicts the three fringe patterns (maps and annotated by $F_{ab}(\hat{s}, \lambda)$) and the fitted fringe NPCs (black lines) in the image-plane for the uncalibrated 3C286 data at λ=3.2 cm with the JVLA. The three line styles correspond to the projected detector spacings of 7.5 km, 12.4 km, and 15 km. The x- and y-coordinates are in Right Ascension and Declination, which are closely related to the direction-cosine coordinate system used in FIGS. 2 and 3.

Figure 7:
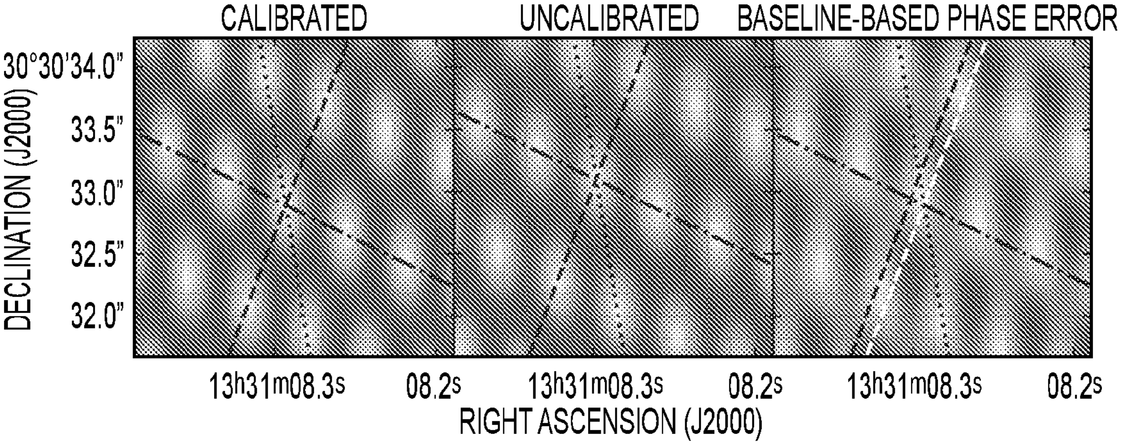
FIG. 7 depicts images made with the superposition of the three fringe patterns shown in FIG. 6 from calibrated (left), uncalibrated (middle), and baseline-dependent phase-corrupted 3C286 data (one visibility phase corrupted by) 80° from the JVLA using the same black-colored line styles as before for the principal fringe NPCs.

FIG. 7 depicts images made with the superposition of the three fringe patterns shown in FIG. 6 from calibrated (left), uncalibrated (middle), and baseline-dependent phase-corrupted 3C286 data (one visibility phase corrupted by) 80° from the JVLA using the same black-colored line styles as before for the principal fringe NPCs. The calibrated and uncalibrated three-fringe interference patterns look identical except that the lack of calibration results in a net displacement of the interference pattern by 0.2" relative to the calibrated fringes, which indicates the magnitude of the required phase calibration terms. Independent of calibration, the principal fringe NPCs in both cases are nearly coincident with each other which geometrically confirm that 3C286 has a highly compact structure, such that the principal closure phase, $\phi_3(\lambda)\approx 0$ as expected, and remains invariant even when the element-based instrumental and tropospheric phase corruption terms remain undetermined. A baseline-dependent phase error (80°, relative to the calibrated case) on one of the visibilities results in a shifting of the fringes corresponding to that corrupted visibility (from the uncorrupted fringe NPC shown in white dashed line to the corrupted fringe NPC in black dashed line), while the other two remain unchanged. The resulting three-fringe interference pattern is very different from the other two panels, and the fringe NPCs are no longer coincident as evident from the non-zero area of the triangle enclosed by the three black lines, and hence, the closure phase, $\phi_3(\lambda)\neq 0$ even for 3C286, a point-like source. Thus, in the presence of baseline-dependent phase errors, the SOS conservation does not apply to the enclosed triangle, and the three-fringe interference image is no longer a true physical observable.

Figure 8:
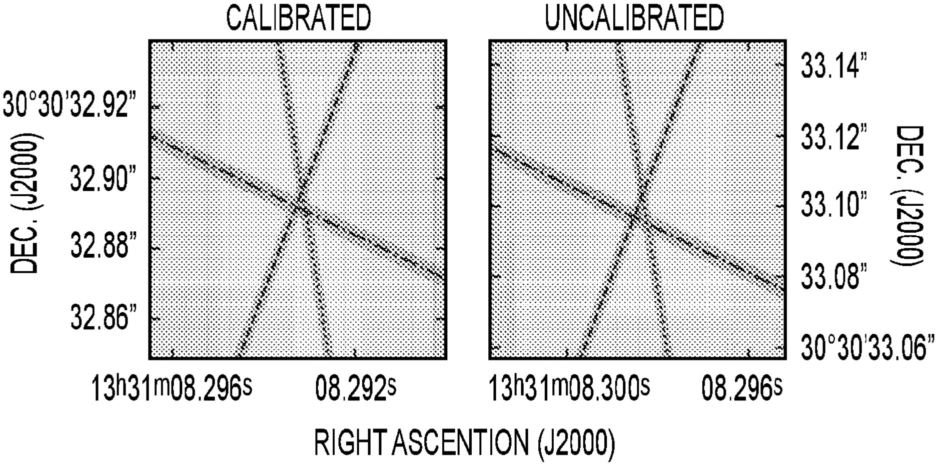
FIG. 8 depicts a zoomed-in view of the left and middle panels in FIG. 7.

FIG. 8 depicts a zoomed-in view of the left and middle panels in FIG. 7. The gray-shaded regions indicate twice the RMS uncertainties in the determined positions of the fringe NPCs, which depend on the RMS phase errors [$\approx(S/N)^{-1}$ when S/N>>1] in the measured visibilities, as guided by Equation (9). In this case, S/N≈133. The level of these uncertainties imply that the differences in the measured closure phases (based on both the principal triangle's height given by Equation (9), and the areas enclosed by the three fringes given by Equation (10)) using the calibrated and the uncalibrated cases, are statistically consistent with each other and are also consistent with $\phi_3(\lambda)=0$.

Figure 9:
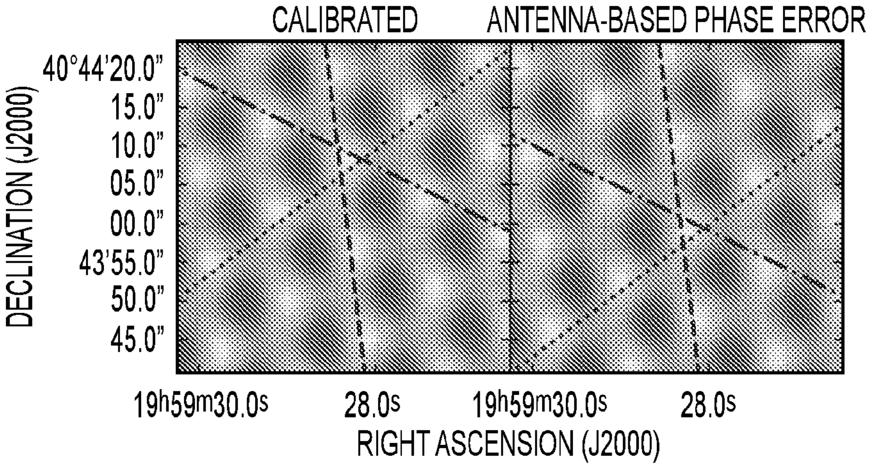
FIG. 9 depicts the three-fringe interference pattern for Cygnus A data.

FIG. 9 depicts the three-fringe interference pattern for Cygnus A data. The phase corruption of one antenna measurement results in the parallel displacement of the interference pattern relative to the calibrated fringes, which indicates the magnitude of the required phase calibration terms. Independent of calibration, the principal fringe NPCs in both cases are clearly non-coincident with each other which geometrically confirms that Cygnus A has a complex structure (see FIG. 4) in contrast to 3C286. Gray-shaded regions indicate twice the RMS uncertainties in the determined positions of the fringe NPCs as determined from Equation (9), but they are barely visible due to the high S/N (≳275) in the visibilities. The closure phase calculated from the principal triangle's heights is $\phi_3(\lambda)\approx 112.9°$ with an RMS uncertainty of ≈1.5°, and remains invariant even after the element-based phase of one antenna measurement was corrupted by 80°. $\phi_3(\lambda)$ estimated from the area relations are ≈112.5° and ≈113.7° from the calibrated and uncalibrated fringe NPCs, respectively. In terms of visualizing closure phase, these images show clearly the SOS conservation theorem, meaning that, for a closed triad of array elements, the resulting images are a true representation of the sky brightness distribution, independent of element-based phase corruption, besides an overall translation of the pattern. If the phase error was dependent on the baseline vector instead of an antenna, only one of the NPCs that corresponds to the affected baseline will be displaced while the other two will remain unchanged and unconstrained by this phase perturbation, thereby changing the size of the resulting triangle in the image plane, as demonstrated in the case of 3C286 in the right panel of FIG. 7. Thus, in the presence of a baseline-dependent phase error, the SOS conservation theorem will not apply.

Figure 10:
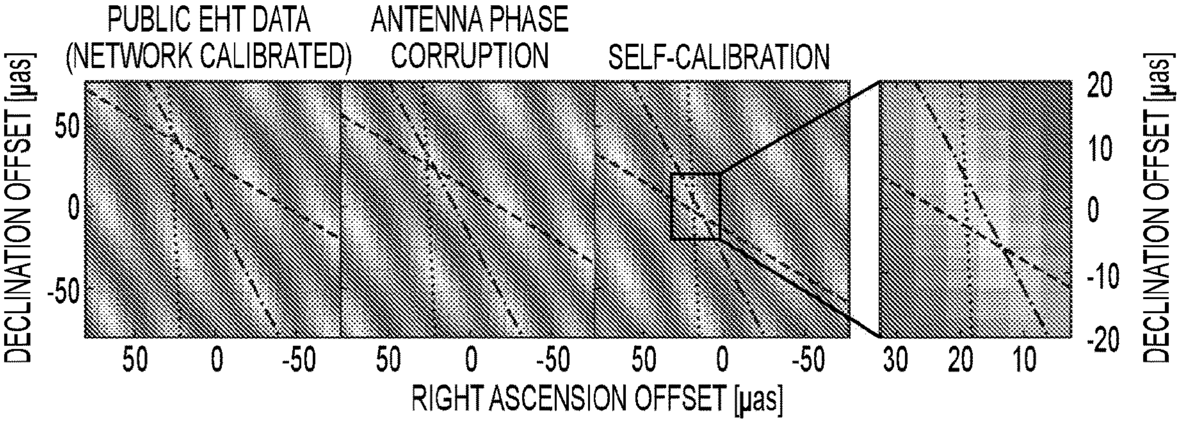
FIG. 10 depicts the three-fringe interference images of M87 using a snapshot (1 min) of data from the EHT at 229.1 GHz.

FIG. 10 depicts the three-fringe interference images of M87 using a snapshot (1 min) of data from the EHT at 229.1 GHz. The stations involved are: ALMA, the LMT, and the SMA. The first panel (from left) shows the three-fringe interference pattern from the public EHT data on M87 that has a priori flux density scale and delay calibration applied. The second panel corresponds to the public data but with one element (ALMA) phase corrupted by 80°. The third panel is obtained by hybrid-mapping and self-calibration. The three-fringe interference pattern is found to be the same across these panels except for an overall translation relative to each other. The fourth panel is an inset showing the zoomed-in view of the self-calibrated three-fringe interference pattern in the third panel. The fringe NPCs enclose a triangle of a finite area, thereby indicating a non-zero value for closure phase that was estimated from the image plane to be ≈38.8° and ≈38.5° from the "principal triangle's height" and "product of areas" methods, respectively. These agree, within errors, with the value of ≈37.5° derived from the aperture plane measurements (i.e., the visibilities). Besides confirming that the three-fringe interference pattern remains the same except for relative overall shifts, these closure phase estimates were found to be consistent between the three panels denoting different degrees of calibration accuracy, thereby verifying the SOS conservation theorem.

Figure 11:
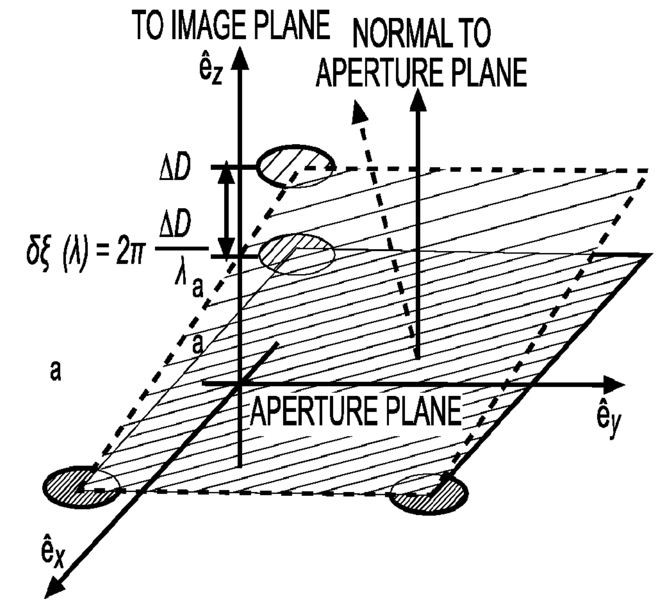
FIG. 11 shows a schematic representation of what occurs when the electronic phase of one element in a closed triad is corrupted.

FIG. 11 shows a schematic representation of what occurs when the electronic phase of one element in a closed triad is corrupted. The three dark circles indicate the elements in the aperture plane (in dark shade of gray), assumed to be on the Z=0 plane, whose normal vector is indicated by the thick, solid upward arrow. These apertures can be considered unmasked regions in an aperture mask of an optical telescope, or radio antennas in a radio interferometer. The radiation is then directed from the elements to the focal (image) plane, wherein a three-fringe image is synthesized by the interference of the EM waves. Consider a phase corruption of one array element (indexed by a) by an amount $\delta\xi_a(\lambda)$. Such a phase corruption is equivalent to a change in path length, $\Delta D_a$, related by $\delta\xi_a(\lambda)=2\pi(\Delta D_a/\lambda)$, from that aperture element to the focal plane. Since three (non-colinear) points determine a plane, one can visualize this phase corruption, or the extra path length, at one of the aperture elements as a tilting of the aperture plane relative to the original. The tilted aperture plane and its normal are shown by the light gray-shaded region and the dashed arrow, respectively. Such a tilt then directs the light in a different direction, leading to a shift of the interference pattern in the image plane. Each of the fringes from baselines that contain the phase-corrupted aperture element will be subject to a position offset in the image plane given by Equation (9). Except for the overall shift, the three-fringe pattern, including the SOS characteristic, is conserved. This argument can be generalized to a scenario when all the three aperture elements in a triad are subject to random phase corruption (i.e., not just a phase gradient across the elements), because the three virtually phase-displaced elements will still define a tilted plane that results in a translation, while obeying SOS conservation.

Figure 12:
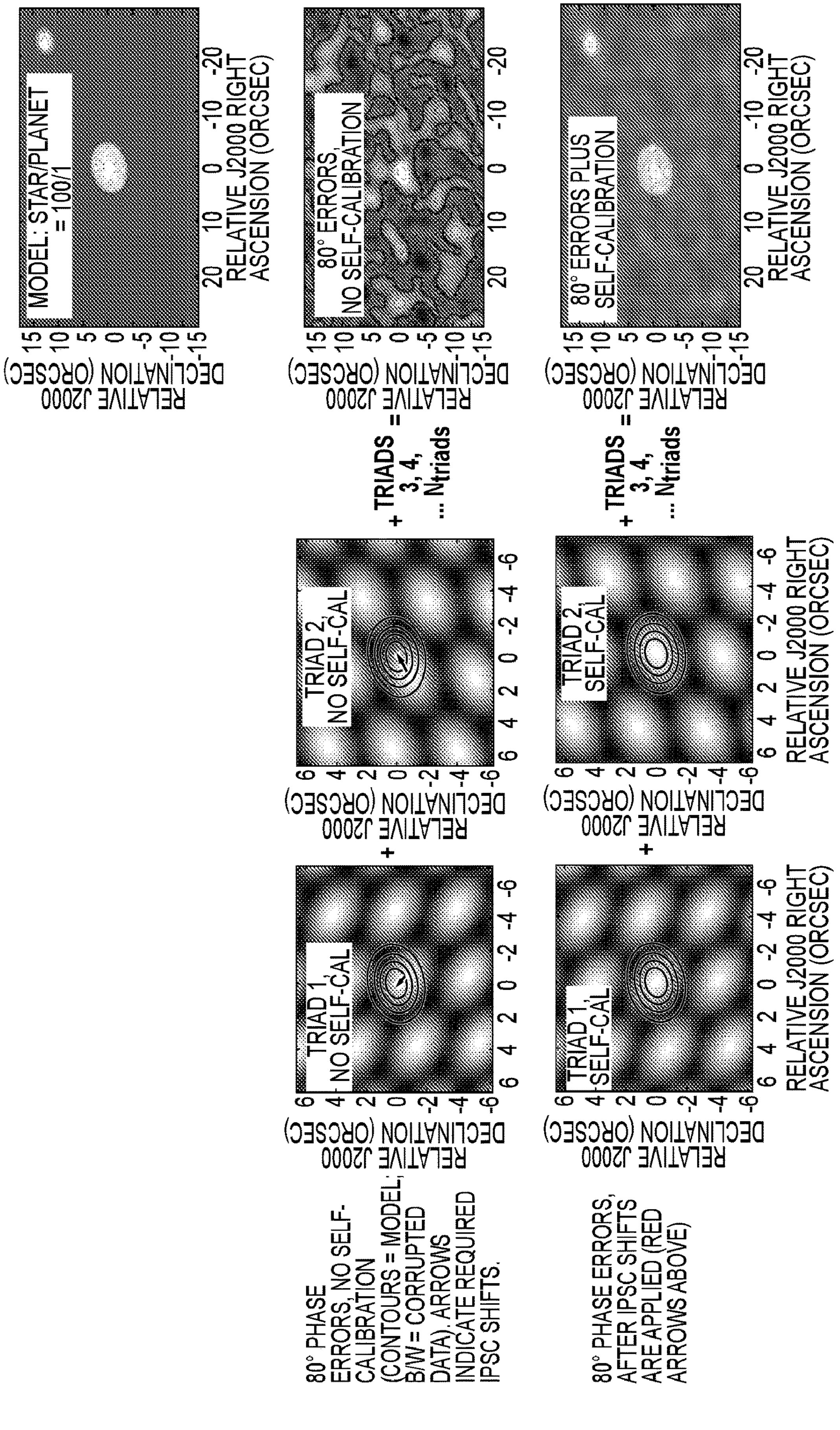
FIG. 12 depicts a schematic of the Image Plane Self-Calibration (IPSC) process.

FIG. 12 depicts an aperture-plane view of an N-polygon array of data capture devices (voltage detectors in radio interferometry), indexed by a=1, 2, . . . N. The detector spacing in wavelength units (or spatial frequencies) and the corresponding spatial coherence are indicated by $u_{ab}$ and $V_{ab}(\lambda)$, respectively, on the adjacent sides. By choosing a vertex (indexed by 1 in this case), adjacent triads sharing this common vertex and having one overlapping side (shown by dashed lines) with the next triad can be defined, each with its own closure phase, $\psi_{3(q)}(\lambda)$, q=1, 2, . . . , N−2. The closure phase on the N-polygon is the sum of the closure phases on these adjacent triads with a consistent cyclic rotation of the vertices as indicated by the arrowed circular arcs, $$\psi_N(\lambda)=\sum_{q=1}^{N-2}\psi_{3(q)}(\lambda).$$

Examples

Real-World Demonstration Using Data from Radio Interferometer Arrays:

Described here are three examples of the image-domain closure phase visualization and measurement method, two using data from the Jansky Very Large Array (JVLA) telescope, and another using the Very Long Baseline Interferometer array comprising the Event Horizon Telescope (EHT). The JVLA is a radio interferometer in New Mexico, comprised of 27 antennas of 25 m diameter, arranged in a Y-pattern. The EHT array consists of seven telescopes spanning the globe, including Europe, South America, continental USA, and Hawaii.

In the first example, the JVLA was employed in its largest configuration ("A configuration") to observe at λ=3.2 cm (ν=9.4 GHz) the target object 3C286, which has a compact core-jet structure and is the dominant source of emission in the field of view. Three antennas (the phase-coherent voltage capture devices or voltage detectors) were selected from the array, corresponding to a triangle with projected spacings (also referred to as baselines in radio interferometry) of 7.5 km, 12.4 km, and 15.0 km.

In the second example, JVLA observations were made at λ=3.75 cm (ν=8 GHZ) of the bright, extended radio galaxy, Cygnus A, which has a total flux density of 170~Jy at this wavelength, and is noted to have complex spatial structure typical of an FR-II morphology (edge-brightened with bright hotspots at the outer edges of their lobes). The observations were made in the 'D' configuration of the VLA, which has a longest baseline length of approximately 1 km, corresponding to a spatial resolution of 8 arcseconds. Three baselines were chosen in a rough equilateral triangle for estimating the closure phase, with baseline lengths of 797.1 m, 773.7 m, and 819.7 m, with correlated flux densities of 22.7 Jy, 26.4 Jy, and 38.3 Jy, respectively.

As a third example, data provided by the VLBI-based EHT observations made at approximately ν=230 GHz of the nuclear regions of the nearby radio galaxy, M87 (Virgo A), with the goal of imaging the event horizon of the hypothesized supermassive black hole was analyzed. The synthesized image shows a non-trivial asymmetric ring structure with a depression in the middle indicating the shadow of the black hole and the ring corresponding to the event horizon. The most sensitive closed triad in the EHT array, namely, the baselines between the Atacama Large Millimeter Array (ALMA), the Large Millimeter Telescope (LMT), and the Submillimeter Array (SMA) was selected.

The three examples used are intended to verify the accuracy of the technique described here when applied to a wide range of real-world conditions, each with its own complexity of spatial structure, observational and technical challenges. 3C286 in example 1 has a point-like morphology. FIGS. 4 and 5 show the synthesized images of Cygnus A (extended double morphology), and M87 (asymmetric ring near the event horizon scale) in examples 2, and 3, respectively. Table 1 summarizes the observation details of the three examples considered.

TABLE 1

Observational and target object's morphological parameters in the three examples.

| Observational Parameter | Example 1 | Example 2 | Example 3 |
|---|---|---|---|
| Target Object | 3C286 | Cygnus A | Center of M87 |
| Morphology | Point-like | Edge-brightened double lobes | Asymmetric ring |
| Telescope array | JVLA | JVLA | EHT |
| Frequency | 9.4 GHz | 8 GHz | 230 GHz |
| Triad Spacings | 7.5 km, 12.4 km, 15.0 km | 0.797 km, 0.773 km, 0.82 km | 5380 km, 9310 km, 880 km |
| Bandwidth processed | 20 MHz | 8 MHz | 1.9 GHz |
| Time duration | 20 s | 8 s | 60 s |
| S/N | 133 | >275 | 4-5 |

Geometrical Methodology for Measuring of Closure Phase in the Image-Domain Using Real Data from Radio Interferometer Arrays In each of the examples, the closure phase was geometrically measured as follows:

1) Determine the three fringe NPCs as follows:
   a. Combine each pair (three possible pairs) of fringes and determine their intersection points (vertices of the triangle) in the image-domain, through the detection of interference maxima in the two-fringe image, for instance. Each of these vertices can be treated as a new phase center, so. See FIGS. 6 and 3.
   b. Using the projected antenna spacings, construct the three fringe NPCs that pass through their corresponding intersection points with the other fringes, using Equation (6).

2) Determine the perpendicular angular offset of any one of these three intersection points from the corresponding fringe NPC opposite to it (or equivalently, any one of the heights of the triangle), which yields $$\delta s'_{ab}(\lambda)$$

in Equation (9). See FIGS. 3, 7, 8, 9, and 10.

3) Using the value of $$\delta s'_{ab}(\lambda)$$

determined above, and using precisely known geometry and placement of the data capture devices in the aperture-plane, determine the closure phase, $\phi_3(\lambda)$, using Equation (9). Note that $\phi_3(\lambda)$ denotes the closure phase obtained from the principal NPCs of the fringes, while $\psi_3(\lambda)$ denotes the general closure phase that corresponds to principal, second-order, or even higher-order fringe NPCs.

FIGS. 3A-C and FIGS. 6 through 10 illustrate the geometric details involved in the methods described herein. Guided by Equation (9), calculate the statistical uncertainties on the fringe position measurements based on the expected RMS phase error (reciprocal of the signal-to-noise ratio, S/N, of the detected fringe), times the fringe spacing (reciprocal of the voltage detector spacing in wavelengths, $u_{ab}$) divided by $2\pi$. The S/N of each visibility listed in Table 1 is obtained by the flux density of the target object divided by the thermal noise per visibility. Note that, since the NPC lines are one-dimensional, these error bars will be perpendicular to a given NPC, i.e. a given visibility provides no information on the position along the fringe itself.

For comparison, it is also possible to calculate the closure phase using the visibilities themselves, meaning in the aperture-, or the Fourier-domain. From the phases of the individual calibrated visibilities on the closed triangle of baselines, one can calculate the closure phase using Equation (4). The error bar was again calculated as a reciprocal of the S/N of the measurement. The phase error per visibility in the high signal to noise case is simply 1/(S/N) in radians. The closure phase is the sum of three visibility phases. Hence the noise increases, by a factor of $\sqrt{3}$ in the measured closure phase.

TABLE 2

Results of closure phase measurements for different examples in Table 1 using different methods. The text in parenthesis denotes calibration status (C = calibrated, U = uncalibrated).

| Method | Example 1 (JVLA 3C286) | Example 2 (JVLA Cygnus A) | Example 3 (EHT M87) |
|---|---|---|---|
| Vertex of three-fringe interferogram (Image plane) Equation (9) | 1.7° ± 1.3° (C)<br>2° ± 1.3° (U) | 112.9° ± 1.5° (C)<br>112.9° ± 1.5° (U) | 37.4° ± 20° (C)<br>41° ± 20 (U) |
| "Product of Areas" (Image plane) Equation (10) | ≈0°<br>≈0° | 112.5° (C)<br>113.7° (U) | 37.1° (C)<br>40.6° (U) |
| Sum of visibility phases (Aperture plane) Equation (4) | 2.6° ± 0.74° (C)<br>2° ± 0.74° (U) | 112.7° ± 0.3° (C)<br>112.7° ± 0.3° (U) | 37.9° ± 15° (C)<br>37.1° ± 0.3° (U) |

Both the image plane and visibility plane methods yield closure phases that are consistent with each other, within the errors, both for calibrated and uncalibrated data, thereby validating the image-plane methods.

Image Plane Self-Calibration

Self-calibration is a well-established technique for generating phase-coherent images of a source from interferometric data that may have large element-based phase distortions. A basic premise of element-based self-calibration is that the 'closure phase' is conserved, corresponding to the argument of the triple product of interferometric visibilities on a closed triad of baselines, the latter commonly known as the 'bi-spectrum'. If propagation, or instrumental, phase corruptions are factorizable into element-based gain terms, the closure phase remains a true measurement of the source brightness properties, independent of the element-based errors.

We present IPSC in the context of astronomical interferometric imaging. The process is translatable to laboratory and other applications of interferometric imaging.

Self-calibration, and closure-phase, have been derived in the context of measurements in the aperture, or voltage, plane of the interferometer. A natural consequence of Shape-Orientation-Size (SOS) conservation, as described herein, is that every image generated from a closed triad of baselines of an interferometer represents a true image of a source, modulo an unknown overall translation due to the element-based phase errors. The translations are idiosyncratic to each triad, hence summing the triad images will not produce a coherent image of the source. SOS conservation for the images then raises the interesting possibility of performing image-plane only self-calibration, by finding and correcting for these independent triad image translations. These translations can be derived through cross correlation of closed-triad images with a simple, a priori source brightness model, then subsequent iteration. The process is a direct analog to what is performed in aperture plane calibration using celestial sources, but does not require aperture plane measurements (visibilities), or element-based complex gains.

Closure phases are geometrically encoded in the SOS of the triangle enclosed by the fringes of a three-element interference pattern in the image plane. Regardless of whether the element-based gain terms in the visibilities are calibrated or not, the SOS parameters of the triangle enclosed by the fringes are conserved, with the only degree of freedom being an arbitrary translation of the triangle. Thus, the three-fringe interference image from any triad of array elements, even if uncalibrated, i.e. uncorrected for element-based phase errors, represents a true sky image that can be reconstructed from that triad, besides an arbitrary translation.

Note that it is assumed that only element-based phase errors are relevant (or, in the image plane, image shifts), and that the amplitudes are reasonably well known and stable. This is a good approximation in the context of optical interferometry, where the dominant errors are due to tropospheric index of refraction changes above the apertures, as well as for many applications of Very Long Baseline Interferometry. In optical interferometry, these element-based phase errors are known as 'piston phases'.

The translation each three-element interference image undergoes is not the same, and it depends on the magnitude of the element-based calibration required for the elements in each triad. That is, without accurate knowledge of these triad-dependent translations, the different three-fringe interferograms will be incoherent with respect to each other and a simple summation will not yield a coherent image unless these translations can be computed and corrected for. Conversely, if the effect of the arbitrary translations can be undone, the sum of the three-fringe images is expected to yield the same synthesized image as from standard aperture synthesis after phase calibration. A related point is that shifting individual visibility fringe images involving only two elements, based on a model comparison, as opposed to closed triad images, will simply turn the data into the model identically, in an analogous manner to baseline-based aperture plane self-calibration, since the problem is under-constrained.

If the instrumental or other measurement phase error terms can be factored into element-based phases, then every closed-triad three fringe image represents a true image of the sky, modulo an unknown translation for each triad image. An easy way to visualize how this works for an interferometer is given in FIG. 11. The fact that each closed triad image is a true image of the sky with an arbitrary position offset raises the possibility of an image-plane self-calibration (IPSC) process, without resort to aperture plane measurements or element-based voltage gains.

The IPSC process employs a model sky image. The observed sky images generated from each three-baseline closed triad of visibilities are then cross correlated with the model sky image, to derive the unknown shifts in the two sky coordinates for each triad image due to element-based phase errors, i.e. the peak in the cross correlation corresponds to the required shift for each triad image to restore the true sky position. The shifted triad images are then summed, leading to a coherent image of the sky brightness distribution. This process is directly analogous to aperture plane self-calibration, where the argument of array element complex gains (the piston phases), are derived through comparison with a sky model image transformed to the visibility domain.

FIG. 12 demonstrates how the IPSC process operates with a simple example. The upper right image depicts a sky model for the 'star' and 'planet', both point sources with fluxes of flux 1000 mJy and 10 mJy, respectively. On the left side there are greyscale images made from two closed triads of baselines, showing the grid pattern characteristic of such triad images. The contours are the uncorrupted sky model. The top left row shows images with 80° phase errors. The field of view is smaller than the far right frames, in order to display the position offsets due to phase errors, as indicated by the red arrows. The bottom left row shows images after self-calibration, in which the corrupted images are cross correlated spatially with the sky model, deriving the shifts to restore true source position (see the arrows). The far right middle and lower frames show resulting images after summing all the closed triad images for the array with and without self-calibration. Without self-calibration (middle-right), the star is decorrelated (71% of true flux), and the side-lobe noise is very high, precluding detection of the planet. With self-calibration (lower right), the true sky model is well recovered, including the faint planet. Contour levels in the right three frames are a geometric progression in factors of two, starting at 1 mJy (negative contours dashed).

The self-calibration process is iterative, in both the aperture and image plane, where a starting, simple sky brightness model is assumed, from which initial solutions are derived (element gain phases for visibilities, or triad image shifts in the case of IPSC). A second, improved model is then synthesized from the corrected data, and shifts are re-derived using this new model, and the process is repeated as necessary.

The self-calibration process converges since the problem is over-constrained. For APSC each measurement corresponds to a visibility, hence, there are (N−1)/2 phase measurements from the visibilities, and N−1 unknown element-based phase corrections (relative to a reference interferometer element), hence the APSC process is over-constrained by a factor of ~N/2.

In our current implementation of IPSC, we derive two shifts (RA and Dec), via cross correlation of each measured triad image with the model image. This spatial correlation is done independently for each triad. Each triad is comprised of three measurements (visibilities), so the over-constraint factor is 3/2, independent of how many antennas are in the full array. The analogy in APSC would be performing self-calibration for an N-element array, but using only triads of elements independently to derive the element-based phase corrections. In the latter case, again there are two unknowns (element phases relative to a reference element), and three measurements (visibility phases). In all cases, the astrometry is set by the input model.

Numerical Tests of Image Plane Self-Calibration: Methodology

To demonstrate IPSC, imaging and calibration simulations were performed in the context of radio astronomical interferometric measurements, at an observing frequency of 8 GHz. A configuration from the Atacama Large Millimeter Array (ALMA) set of configurations was adopted, with a maximum baseline of 2500 m, reduced to 14 elements for ease of testing. While the simulations are done in the context of radio interferometry, the technique is generalizable to laboratory, and ground and space-based interferometers across the electromagnetic spectrum. The results are displayed in FIGS. 12 and 13, and quantified in Table 3.

A simple source model for the initial tests of the procedure was used. For example, two point sources separated by 26", with a dominant bright source, and faint companion, with a 100/1 flux ratio was used. Such a physical situation might correspond, in optical interferometry, to a binary dwarf star, or star-planet, system. For ease of reference, the bright source is referred to as the 'star' and the faint as the 'planet' throughout. The results may be scaled to interferometric measurements at any wavelength, using the relative observing wavelength and baseline lengths. For the adopted array and frequency, the point response function (synthesized beam) has a full width at half maximum (FWHM) of 3", implying a source separation of 9 synthesized beams ('point spread functions').

Tests of the procedure were also performed with a 10 times fainter companion (1000/1 flux ratio), and a brighter planet (10/1 flux ratio), to explore the limits of the process in the context of the procedures adopted. The model visibility data set is generated the tools available in the Common Astronomical Software Applications (CASA). It assumes a single snap-shot observation in time, and single frequency. Software is implemented that then corrupts the visibility phases on a per element basis. A random distribution of element-based phase corruptions is adopted in the range of +/−10° in the primary test case and +/−80° in a second case.

These tests assume a high signal to noise situation, even for the companion, meaning no thermal noise is added. Such an approach is reasonable when making a first theoretical assessment of whether a new approach to calibration will work.

Triad-images were generated (or full synthesis images in the case of aperture self-calibration), in CASA, with a pixel size of 0.25", or 10 pixels per FWHM of the synthesized beam. For the image-plane self-calibration, all the triad images of the array were generated, corresponding to 364 triad images for a 14 element antenna array. The binomial 'choose three' formula used was $N_{triads}$=N (N−1) (N−2)/6. Summing these triad-images with equal weight, and normalizing by the number of triads, then corresponds to a naturally weighted image of the sky. The convention in the imaging software used for each triad image is to have the flux equal that seen in the sky, e.g. a 1 Jy point source would have a flux of 1 Jy in each triad image, hence normalization by $N_{triads}$ in the sum.

The shift for each triad-image was calculated by computing the discrete two-dimensional cross-correlation of the triad-image and a model-image using standard functions in PYTHON. The position of the maximum pixel of this cross-correlation is the shift that is applied to the triad images. The triad-images are shifted, and then summed together to get the image-plane self-calibrated image.

Figure 13:
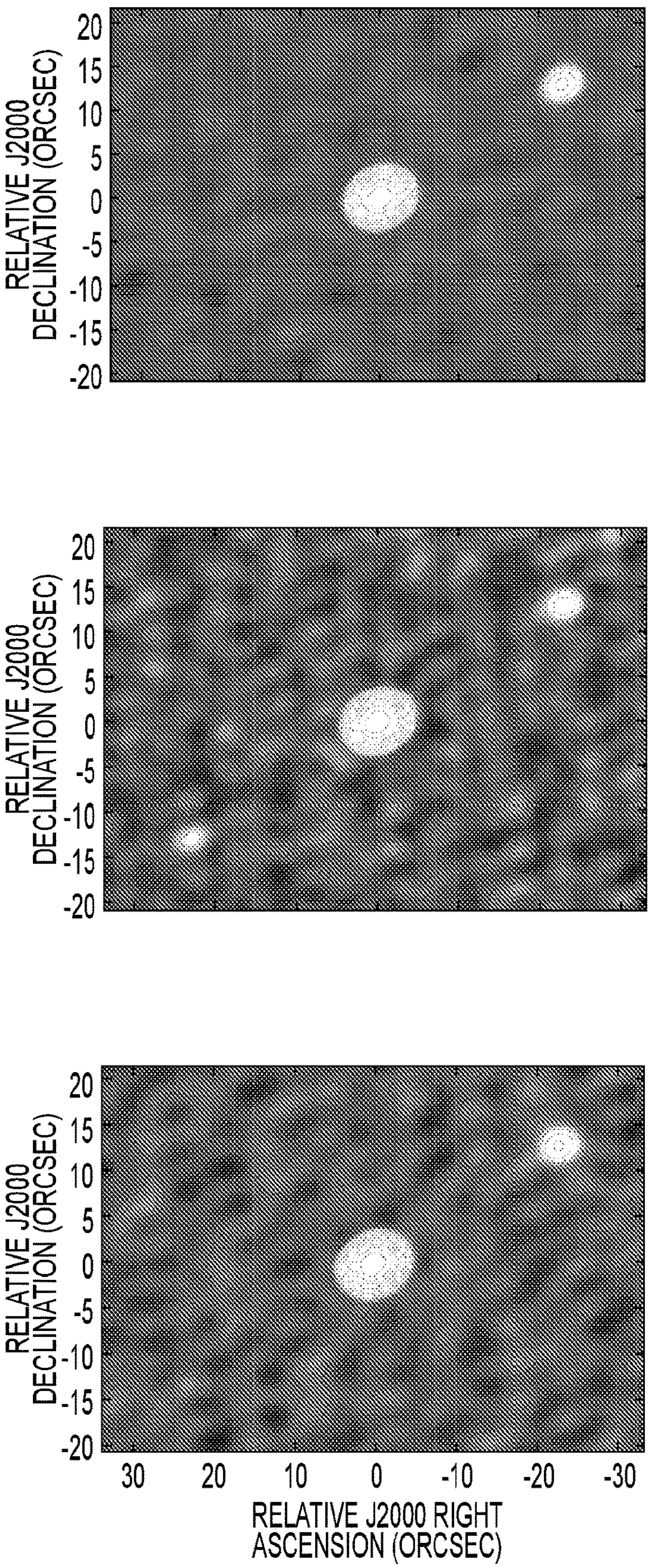
FIG. 13 depicts results for an IPSC model with a 1000 mJy planet and 10 mJy planet with 10 degree phase errors.

Once the self-calibration process is complete, a gridded image-based deconvolution is preformed using the tools in the Astronomical Image Processing System (AIPS), with the appropriate synthesized beam image Numerical Tests of Image Plane Self-Calibration: Results FIG. 13 shows results for the model with a 1000 mJy planet and 10 mJy planet with 10° phase errors. The upper box shows an image after aperture-plane phase self-calibration using a star-only model. The center box shows the same, but using image-plane self-calibration with a star-only model. The lower box also shows the same, but using image-plane self-calibration with the star and planet model. In all cases, the contour levels are a geometric progression in factor two, starting at 0.25 mJy/beam. Negative surface brightness contours are dashed. The color scale goes from −0.001 mJy/beam to 0.0025 mJy/beam.

Table 3 lists the results for various models and assumptions. These include: a model with no errors to set the numerical limits of the process, and results for APSC and IPSC. Listed are the resulting planet flux (the star, in all cases, is 1000 mJy), the rms noise in the image, and the strength of a 'ghost' source that appears symmetrically reflected across the star position in some instances. It is noted that for 10° phase errors, the planet is not detectable in the 100/1 model due to residual sidelobes from the bright star (see row two in Table 3), without some form of self-calibration to correct the errors.

TABLE 3

Results for Image Plane self-calibration simulations for the star-planet models.

| Data | Planet mJy[a] | Ghost mJy | rms mJy beam$^{-1}$ |
|---|---|---|---|
| Model: star = 1000 mJy, planet = 10 mJy, pix = 0.25" | 9.94 | 0.0052 | 0.0064 |
| 10° errors; No Self-cal | 5.8 | 0.9 | 9 |
| 10° errors; aperture self-cal star only | 9.70 | 0.20 | 0.089 |
| 10° errors; image self-cal star only | 6.26 | 2.63 | 0.25 |
| 10° errors; image self-cal star and planet | 8.97 | 0.62 | 0.20 |
| 80° errors; image self-cal star and planet | 8.61 | 0.84 | 0.18 |
| 10° errors; image self-cal wrong planet | 6.70 | 2.20 | 0.30 |
| 10° errors; image self-cal star and planet, pix = 0.5" | 8.5 | 1.3 | 0.27 |
| 10° errors; image self-cal star and planet, pix = 0.16" | 8.85 | 0.75 | 0.16 |
| Model: star = 1000 mJy, planet = 1 mJy | | | |
| 10° errors; image self-cal star only, 1 box | 0.72 | 0.025 | 0.15 |
| 10° errors; image self-cal star only, 2 boxes | 0.88 | 0.096 | 0.14 |
| 10° errors; image self-cal star and planet, 2 boxes | 0.84 | 0.15 | 0.15 |
| Model: star = 1000 mJy, planet = 100 mJy | | | |
| 10° errors; image self-cal star only | 65.0 | 21.0 | 1.9 |
| 10° errors; image self-cal star + planet | 88.1 | 6.9 | 0.69 |

For APSC, even with a single calibration cycle using a single point source, the resulting image is high quality, with essentially full recovery of the planet, and barely significant indication of a ghost source.

For IPSC, initial calibration with a star-only model (single point source), results in an image in which the planet is recovered, but the planet flux is only 63% of its true flux. Further, a ghost source appears symmetrically reflected across the star position to the southeast, with a flux about 26% of the model planet flux. The rms is about three times larger than for the aperture plane self-calibration. Further iteration including the planet in the self-calibration model shows convergence in one or two more iterations, recovering 90% of the planet flux, and the ghost source is reduced to 6% of the model planet flux.

Additional tests were performed, including larger phase errors, an incorrect starting model, a fainter planet, and a brighter planet. In all cases, the IPSC process converges in a manner similar to that discussed above, as can be seen by the results listed in Table 3.

Embodiments of the method described herein derive phase coherent images of sources with an interferometer in situations where interferometric phase errors (piston phases), can be factorized into element-based terms. The method is preferably implemented completely in the image domain, without resort to aperture plane measurements of visibilities, or element-based voltage complex gains. The image plane self-calibration process preferably employs images made from closed triads of baselines, which naturally obey SOS conservation. The process preferably entails cross correlation of each triad image with models of source brightness to derive the arbitrary image shifts due to element-based phase errors. After correcting for these shifts, a coherent image of the source brightness is generated, recovering source structure.

In the case of a simple source model consisting of two point sources with a flux ratio of 100/1, the process allows for identification of the two source components, and converges on a final image that is a reasonable representation of the brightness distribution. The method can be used with small and large phase errors, an incorrect starting model, and varying star-planet ratios. The process converges in all cases.

Image plane self-calibration may be particularly advantageous in existing and proposed interferometric arrays that employ only three or four elements. In these cases, coverage of the Fourier plane is done by moving elements in subsequent integrations. Hence, any self-calibration vs. time is done using only the few elements of the array. Moreover, these small N arrays are often built with specific imaging goals in mind, typically involving simple sources for which dense Fourier plane coverage is not paramount.

There may also be situations in which generating a phase coherent image strictly using image-plane results is advantageous relative to conversion to the aperture plane, particularly in situations where the primary measurements are made in the image-plane, such as in optical interferometry and most laboratory interferometers.

Practical applications of closed triad image plane self-calibration, include: optical or near-IR multi-element interferometry, where instead of generating two-element fringe images for each baseline with the optical system, a set of three fringe images is generated using closed triads. These can then be aligned via the IPSC process, employing a simple starting model. A specific astronomical example would be the VLTI/GRAVITY array, which only employs four elements, and hence does not afford any large N advantage for self-calibration. A second astronomical application includes space-based mid-IR interferometry employing a set of a few free-flying telescopes. Again, the measured interferometric product would be the time series of closed triad three fringe images, for which piston phase noise due to line-of-sight jitter in the telescope positions could be corrected via the IPSC process. The application to accurate calibration of small N arrays in the laboratory or industry is straight-forward.

IPSC preferably entails cross correlation of images made from a triad of apertures, with a model of source brightness, to derive the idiosyncratic image shifts due to element-based phase errors. After correcting for these shifts, a coherent image of the sky brightness is preferably generated by summing images from different triads and thus recovering source structure. The process is iterative, using improved source models based on previous iterations.

Iterative IPSC demonstrates the convergence of the technique in context of a dominant central source and weak nearby source, under varying circumstances and using triad configurations inspired by radio-interferometer configurations. The technique is generalizable to interferometry at all wavelengths, and to broader applications of interferometric imaging and Fourier optics, including optical and near-IR interferometry, and laboratory or industrial systems in which accurate calibration and image recovery is required, such as laser interferometers, in particular, for arrays for which the measurements are made directly in the image plane.

IPSC can be used in remote sensing (passive and active). For example, IPSC can be used in radio interferometry at low and high frequency where calibration may be problematic, radar imaging, satellite imaging, space situational awareness, surveillance, and/or ground imaging from space for climate, geology, general mapping, and/or surveillance. The method may also be useful in optical remote sensing. For example, IPSC can be used in optical and near-IR interferometry from space and/or ground, in satellite imaging, and/or in ground imaging from space.

IPSC can also be used in general imaging or spectroscopy applications using interferometric devices, and Fourier phase retrieval methods, for accurate calibration and image recovery with such devices, where the signal-to-noise ratio may be high, but wavefront phase corruption remains an issue, and hence image reconstruction requires phase correction. Possibilities include: in medical imaging, sonar interferometry, laboratory and industrial laser interferometry, surveillance, security screening, X-ray Crystallography, radar imaging, seismic imaging, and/or diffraction microscopy. One industrial application is for synchrotron light sources, to measure the synchrotron beam shape, and infer relativistic electron beam emittance. Here IPSC would allow correction of wavefront errors due to optics and in-air propagation and allow a reconstruction of an image of the synchrotron beam in two dimensions.

A possible advantage of IPSC is that simple processing requirements mean that very high frame rates can be processed in real time to reconstruct the images. High frame rates are common in the laboratory, where bright artificial radiation sources can be used. In such a lab setting a mechanical or a microoptoelectromechanical system may be used to rapidly reconfigure the apertures in order to fill-out the uv-plane for a small-N array. For example, an addressable array of very small mirrors (for example, a digital micromirror device) may be used to select three apertures from a larger aperture plane at reasonable rates leading to possibility of good quality diffraction-limited imaging on sub-second time scales.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A method of interferometric self-calibration in the image plane, comprising the steps of: initializing a first image model;

deriving first X and Y shift values for each measured triad images by cross correlation with the first image model;

shifting a first position of each measured triad image using the first X and Y shift values;

synthesizing a second image model by summing the first shifted positions of the measured triad images;

deriving second X and Y shift values for each measured triad image by cross correlation with the second image model;

shifting a second position of each measured triad image using the second X and Y shift values;

synthesizing a third image model by summing the second shifted positions of the measured triad images; and repeating the steps of deriving X and Y shift positions of a preceding synthesized image model, shifting the position of each measured triad image using the X and Y shift values, and synthesizing an additional image model by summing shifted positions of the measured triad images until a convergence point to obtain an image-plane self-calibrated image.

2. The method of claim 1, wherein steps of deriving the second measured triad image shift solution and synthesizing the third image model are repeated at least one additional time.

3. The method of claim 1, wherein there are a plurality of triads and the deriving and synthesizing steps are performed independently for each triad.

4. The method of claim 1, wherein the steps are completed without resort to visibilities or detector voltages in the aperture plane.

5. The method of claim 1, wherein the method is geometrical and employs measured images of intensity.

6. The method of claim 1, wherein the deriving steps are calculated by computing the discrete two-dimensional cross-correlation of the triad image and the model image.

7. The method of claim 6, wherein a position of a maximum pixel of this cross-correlation is the shift that is applied to the triad images.

8. The method of claim 1, wherein the method employs images made from closed triads of baselines.

9. The method of claim 1, wherein the image-plane self-calibrated image is a coherent image of the source brightness.

10. A system for obtaining an image-plane self-calibrated image, comprising: an image sensor; and a processor in communication with the image sensor, wherein the processor: obtains a measured triad images from the image sensor;

is initialized with a first image model of the measured triad images;

derives first X and Y shift values for each measured triad images by cross correlation with the first image model;

shifts a first position of each measured triad images using the first X and Y shift values;

synthesizes a second image model by summing the first shifted positions of the measured triad images;

derives second X and Y shift values for each measured triad images by cross correlation with the second image model;

shifts a second position of each measured triad images using the second X and Y shift values;

synthesizes a third image model by summing the second shifted positions of the measured triad images;

repeats the steps of deriving X and Y shift positions of a preceding synthesized image model, shifting the position of each measured triad image using the X and Y shift values, and synthesizing an additional image model by summing shifted positions of the measured triad images until a convergence point is reached; and outputs an image-plane self-calibrated image of the converged image model.

11. The system of claim 10, wherein steps of deriving a second triad image shift solution and synthesizing a third image model are repeated at least one additional time.

12. The system of claim 10, wherein there are a plurality of triads and the deriving and synthesizing steps are performed independently for each triad.

13. The system of claim 10, wherein the steps are completed without resort to visibilities or detector voltages in the aperture plane.

14. The system of claim 10, wherein the steps completed by the processor are geometrical and employ measured images of intensity.

15. The system of claim 10, wherein the deriving steps are calculated by computing the discrete two-dimensional cross-correlation of the triad image and the model image.

16. The system of claim 15, wherein a position of a maximum pixel of this cross-correlation is the shift that is applied to the triad images.

17. The system of claim 10, wherein the processor employs images made from closed triads of baselines.

18. The system of claim 10, wherein the image-plane self-calibrated image is a coherent image of the source brightness.

* * * * *